United States Patent Office 2,879,269
Patented Mar. 24, 1959

2,879,269

WATER-INSOLUBLE DIPHENYLAMINE DYESTUFFS

Ernest Merian, Bottmingen, Switzerland, assignor, by mesne assignments, to Saul & Co., Newark, N.J., as nominee of Fidelity Union Trust Company, executive trustee under Sandoz Trust No Drawing. Application October 15, 1956
Serial No. 615,767

Claims priority, application Switzerland October 20, 1955

6 Claims. (Cl. 260—239.7)

The present invention relates to new water-insoluble diphenylamine dyestuffs which correspond to the general formula

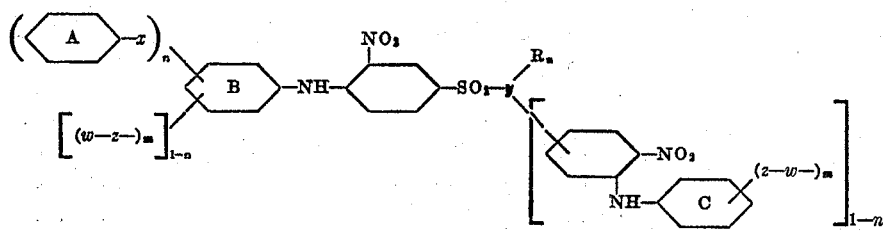

wherein
y stands for the direct linkage, oxygen, the imino or an alkylimino group,
R stands for a mono- or dinuclear carbocyclic radical or an aliphatic radical containing at least 5 and at most 18 carbon atoms or together with y, when y represents an imino group, a heterocyclic radical,
x stands for the direct carbon linkage or a methylene, ethylene, vinylene, oxygen, sulfur, sulfoxide, sulfone, azo or oxymethylene bridge,
z stands for one of the radicals —CH$_2$O—, —O—CH$_2$—O—, —O—CH$_2$—CH$_2$—O—
—O—CH$_2$—CH$_2$—CH$_2$—O—
—O—CH$_2$—CH(CH$_3$)—O— or
—O—CH(CH$_3$)—CH$_2$—O— w hydrogen or a lower alkyl radical which may bear ether and/or hydroxy groups,
m stands for one of the figures 1 or 2,
and
n stands for 0 or 1, and in which the nuclei A, B and C may contain further substituents such as fluorine, chlorine, bromine, alkyl containing at most 18 carbon atoms, mononuclear aryl, cyclohexyl, benzyl, trifluoromethyl and acylamino, acyl being carboxylic acid acyl.

The process for their production consists in reacting, preferably in presence of an acid-binding agent, 1 mol of a 1-halogeno-2-nitrobenzene-4-sulfonic acid derivative of the formula

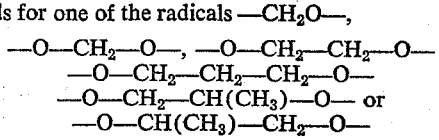

wherein Hal stands for chlorine or bromine, and y and R possess the above-named meanings, with 1 mol of an aminobenzene free from water-solubilizing groups, which has the formula

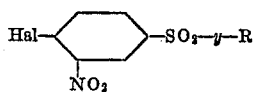

wherein x, A and B possess the above-named meanings, or, when y represents the direct linkage and R a 4'-halogeno-3'-nitrophenyl radical, with 2 mols of an aminobenzene free from water-solubilizing groups and of the formula

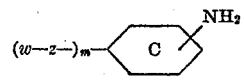

wherein w, z, m and C possess the above-named meanings.

The new dyestuffs have not very good building-up-properties from an aqueous dispersion but they are very well suited for dyeing in the mass materials dissolved in organic solvents which are subsequently extruded as filament, for example cellulose acetate. As they are well soluble in organic solvents, e.g. acetone, the spinning of masses dyed with them presents no technical difficulties. The solution-dyed shades obtained in this way are fast to light, washing, cross dyeing, gas fumes, dry cleaning and peroxide. The new dyestuffs can also be employed for coloring plastics of all kinds and for pigmenting lacquers.

The reaction of the 1-halegeno-2-nitrobenzene-4-sulfonic acid derivatives with the aminobenzenes is conducted advantageously at elevated temperature. Among the suitable reaction media, those preferred are water or an organic solvent, e.g. ethanol, benzyl alcohol, benzene, toluene etc. An addition of a suitable acid-binding agent, for example sodium acetate, sodium carbonate or sodium bicarbonate, exercises a favorable influence on condensation in the majority of cases. The same service is performed by an excess of the amine or amines employed in the reaction.

For use as radicals R which together with y are capable of forming a heterocyclic ring, the radicals of the following nitrogen heterocycles enter into consideration: Thiadiazolidine, triazine, triazoline, triazolidine, tetrazine, oxazolidine, thiazolidine, imidazoline, imidazolidine, pyrrole, pyrrolidine, oxadiazine, thiadiazine, pentoxazoline, pentoxazolidine, morpholine, homomorpholine, penthiazoline, m-thiazane, thiamorpholine, pyrimidine, pyrazine and piperidine.

The 1-halogeno-2-nitrobenzene-4-sulfonic acid derivatives used according to the present definition as starting products can be produced by known methods from 1-halogeno-2-nitrobenzenes by the introduction of the substituted sulfonic acid radical or by nitration of the 1-halogenobenzene-4-sulfonic acid derivative. Of especial interest are 1-halogeno-2-nitrobenzene-4-sulfonic acid-arylesters, -arylamides, -cycloalkylamides, -alkylarylamides, -morpholides, -oxazolidides or -oxazides, 4-halogeno - 3 - nitro - 1.1' - diphenylsulfones and 4.4'-dihalogeno-3.3'-dinitro-1.1'-diphenylsulfones.

The aminobenzenes of the general formula

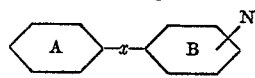

which are used according to the invention may be further substituted. In particular, they may contain alkyl, aryl, aralkyl or cycloalkyl radicals, halogen atoms, trifluoromethyl groups or acylamino groups. Examples of those which find employment are 4-amino-1.1'-diphenylester or -thioether, 4-amino-4'-butyl-1.1'diphenylether or -thioether, 4 - amino - 4' - octyl - 1.1' - diphenylether or -thioether, 4-amino-4'-cyclohexyl-1.1'-diphenylether or -thioether, 4-amino-2',4'-dichloro-1.1'-diphenylether or -thioether, 4-amino-2',4',5-trichloro-1.1'-diphenylether or -thioether, 4-amino-1-benzylphenylether or -thioether and their 2-halogeno-derivatives, 4-amino-1.1'-diphenylmethane, 4 - amino - 1.1' - diphenylethane, 4-amino - 1.1'-stilbene, 4-amino-2.2'-dichloro-1.1'-stilbene, 4-amino-4'-acetylamino - 1.1' - diphenyl, 4 - amino - 4' - acetylamino - 3.3' - dimethoxy - 1.1' - diphenyl, 1 - amino-3 - phenoxymethyl - 4 - methylbenzene, 4 - amino - 1.1'-azobenzene or 4-amino-3.2'-dimethyl-1.1'-azobenzene. Especially interesting are amines which are substituted by alkyl radicals containing if desired ether groups.

Examples of suitable amines corresponding, according to the invention, to the general formula

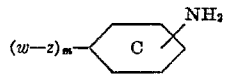

are: 1-(2'-hydroxy)-ethoxy-2- or -3- or -4-aminobenzene, 1-(2'-methoxy or -ethoxy or -propoxy or -butoxy)-ethoxy-2- or -3- or -4-aminobenzene, 1-[2'-(2''-hydroxy)-ethoxy]-ethoxy-2- or -3- or -4-aminobenzene, 1-[2'-(2''-methoxy or -ethoxy or -propoxy or -butoxy)-ethoxy]-ethoxy-2- or -3- or -4-aminobenzene, 1-{2'-[2''-(2'''-hydroxy)-ethoxy]-ethoxy}-ethoxy-2- or -3- or -4-aminobenzene, 1-[2'- or 3'-(2''- or 3''-hydroxy)-propoxy]-propoxy-4-aminobenzene, -1-[2'-(2''-hydroxy)-ethoxy]-ethoxy-3-acetylamino-6-aminobenzene, 1-(2'.3'-dihydroxy)-propoxy-2- or -3- or -4-aminobenzene, 1-methoxymethyl- or 1-ethoxymethyl-2- or -3- or -4-aminobenzene, 1-(2'-hydroxy)-ethoxymethyl-2- or -3- or -4-aminobenzene, 1-(2'-methoxy or -ethoxy)-ethoxymethyl-2- or -3- or -4-aminobenzene, 1-[2'-(2''-hydroxy)-ethoxy]- ethoxymethyl- -2- or -3- or -4-aminobenzene, 1-(2'-hydroxy-ethoxymethyl-3-amino-6-methylbenzene, 1.5-bis-[(2'-hydroxy)-ethoxymethyl]-3-amino-6-methylbenzene and 1-[2'-(2''-methoxy or -ethoxy or -propoxy or -butoxy) - ethoxy] - ethoxymethyl - 3 - amino-6-methylbenzene.

The following examples illustrate the invention. All parts specified therein are by weight; the temperatures are given in degrees centigrade.

EXAMPLE 1

10.5 parts of 1-chloro-2-nitrobenzene-4-sulfonic acid phenyl amide, 10.1 parts of 4-amino-4'-octyl-1.1'-diphenyl ether, 3 parts of sodium bicarbonate and 50 parts of water are heated to the boil with stirring. The resulting emulsion turns a deep yellow in color; after 5½ hours it is cooled and adjusted with hydrochloric acid to react acid to congo paper. After some time the dyestuff thus formed solidifies and can be isolated by filtering and washing with water. Upon recrystallization from ethanol it melts at 151-152°. The new dyestuff dyes cellulose acetate in the mass in very fast reddish yellow shades.

EXAMPLE 2

When the 10.5 parts of 1-chloro-2-nitrobenzene-4- sulfonic acid phenyl amide of Example 1 are replaced by 11.7 parts of 1-bromo-2-nitrobenzene-4-sulfonic acid morpholide and the 10.1 parts of 4-amino-4'-octyl-1.1'-diphenyl ether by 11.2 parts of 4-amino-2-chloro-4'-tert. butyl-1.1'-diphenyl ether, a yellow dyestuff is obtained which melts at 136-139°.

EXAMPLE 3

9.6 parts of 1-chloro-2-nitrobenzene-4-sulfonic acid-di-(2'-hydroxyethyl)-amide, 7.5 parts of 4-amino-4'-tert. butyl-1.1'-diphenyl ether, 3 parts of sodium bicarbonate and 50 parts of water are boiled for 4 hours with reflux. Upon cooling, the aqueous phase is decanted from the oily precipitated dyestuff and the dark brown oil dissolved in 50 parts of ethanol. After some time the sulfonic acid morpholide dyestuff, which is formed by ring closure during condensation and is poorly soluble in ethanol, is precipitated. It is filtered off, washed with ethanol and dried. It melts at 168-170°, is poorly soluble in ethanol and readily soluble in benzene.

In the following table further dyestuffs obtainable according to the particulars given in Examples 1 to 3 are enumerated. They correspond to the formula

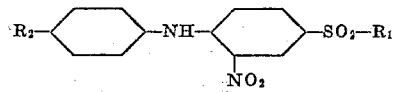

and are characterized by the radical $R_2$, the basic compound $R_1H$ of the radical $R_1$, their melting points, and the color of their solutions in acetone.

Table

| Example No. | $R_1$—H | $R_2$ | Melting Point, °C. | Color of Solution in Acetone |
|---|---|---|---|---|
| 4 | phenylamine | 4'-tert.butyl-phenoxy. | 148-151 | yellow. |
| 5 | N-ethylphenyl-amine. | 4'-octylphenoxy | 120-124 | Do. |
| 6 | 2.5-dichlorophen-ylamine. | do | 171-173 | Do. |
| 7 | 3.4-dichlorophen-ylamine. | do | 173-178 | Do. |
| 8 | 2.3-tetramethyl-enephenyl-amine. | do | 202-206 | Do. |
| 9 | 1-naphthylamine | do | | Do. |
| 10 | morpholine | do | 138-141 | Do. |
| 11 | do | 4'-cyclohexyl-phenoxy. | 215-217 | Do. |
| 12 | do | 2'.4'.5'trichloro-phenoxy. | 177-181 | Do. |
| 13 | do | benzyloxy | 174-179 | Do. |
| 14 | do | phenylazo | 148-152 | Do. |
| 15 | cyclohexylamine | 4'-octylphenoxy | 96-100 | Do. |
| 16 | phenol | do | 98-100 | Do. |
| 17 | di-(2-ethylhexyl)-amine. | 4'-phenylphenoxy | | Do. |
| 18 | N-hydroxyethyl-phenylamine. | phenyl | 136-140 | Do. |

EXAMPLE 19

The acetone-solubility of Examples 11, 12 and 13 is of the order of about 2%. When 10.2 parts of 1-chloro-2-nitrobenzene-4-sulfonic acid morpholide are condensed in an analogous manner with a mixture of 3.7 parts of 4-amino-4'-cyclohexyl-1.1'-diphenylether, 2 parts of 4-amino-2',4',5'-trichloro-1.1'-diphenylether and 2.8 parts of 4-aminophenyl-1-benzylether, a dyestuff mixture is obtained which exhibits substantially better acetone-solubility while possessing the same fastness properties as the earlier cited examples. The freezing point of the mixture is 75°.

EXAMPLE 20

12 parts of 1-chloro-2-nitrobenzene-4-sulfonic acid N-hydroxyethylphenyl amide and 6.2 parts of 4-amino-1.1'-diphenylether are reacted as described in Example 1. It is possible to arrive at the same dyestuff when a solution of 46.1 parts of 4-phenoxy-2'-nitro-1.1'-diphenylamine-4'-sulfonic acid phenylamide and 4.2 parts of caustic soda in 1000 parts of water at 90° is drop-fed with 9.5 parts of ethylene chlorohydrine. The melting point of the product is 159-163°.

EXAMPLE 21

12.5 parts of 4.4'-dichloro-3.3'-dinitro-1.1'-diphenylsulfone, 18 parts of 4-[2'-(2'''-methoxy)-ethoxy]-ethoxy-1-aminobenzene, 6 parts of sodium bicarbonate, 300 parts of ethanol and 30 parts of water are boiled for 6 hours with reflux. Upon cooling the dyestuff is precipitated. It crystallizes from ethanol in needles which melt at 88-92° and have very good solubility in acetone.

EXAMPLE 22

18.8 parts of 4.4'-dichloro-3.3'-dinitro-1.1'-diphenylsulfone, 32 parts of 1-amino-4-(2'-hydroxy)-ethoxybenzene and 250 parts of ethanol are boiled for 20 hours with reflux. Upon cooling the dicondensed dyestuff is precipitated. It is filtered and washed with ethanol, excess amine thereby being brought into solution. By recrystallization from ethanol the new dyestuff is obtained in the pure state having a melting point of 192–195°. This compound is practically insoluble in benzene, but fairly well soluble in acetone.

EXAMPLE 23

A mixture of 18.4 parts of 4.4'-diamino-1.1'-diphenyl, 75 parts of 1-chloro-2-nitrobenzene-4-sulfonic acid N-ethyl-N-phenyl amide, 17 parts of sodium bicarbonate, 700 parts of ethanol and 50 parts of water are boiled for 6 hours with reflux. It is then allowed to cool and the precipitated reaction product filtered. The filtrate is a mixture, the greater part of which consists of the monocondensed product of the formula

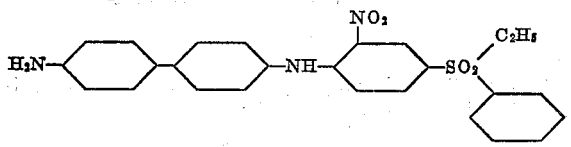

which has a melting point at 192–196°, and the lesser part of the dicondensed product whose melting point is 226–228°. The two dyestuffs can be separated by, e. g. boiling with ethanol, but only the monocondensed dyestuff is sufficiently soluble in acetone to be suitable for dyeing cellulose acetate in the dope.

EXAMPLE 24

25 parts of 4.4'-diamino-1.1'-diphenylsulfone, 68 parts of 1-chloro-2-nitrobenzene-4-sulfonic acid N-ethyl-N-phenylamide, 17 parts of sodium bicarbonate, 50 parts of water and 400 parts of ethylene glycol are boiled for 20 hours with reflux. Upon cooling the reaction product is filtered off and recrystallized from ethanol. Pale yellow needles with melting point 139–145° are obtained.

Other dyestuffs according to the invention which are suited for dyeing in the mass materials dissolved in organic solvents which are subsequently extruded as filament and specially cellulose acetate in yellow shades fast to light, washing, cross dyeing, gas fumes, dry cleaning and peroxide are:

EXAMPLE 25

2-nitro-4'-(4''-butyl) - phenoxydiphenylamine - 4 - sulfonic acid-1'''.3'''-oxazolidide;

EXAMPLE 26

2-nitro-4'-(4''-butyl) - phenoxydiphenylamine - 4 - sulfonic acid-5'''-methyl-1'''.3'''-oxazolidide;

EXAMPLE 27

2-nitro-4'-(4''-butyl) - phenoxydiphenylamine - 4 - sulfonic acid-1'''.3'''-oxazide;

EXAMPLE 28

2-nitro-4'-(4''-butyl) - phenoxydiphenylamine - 4 - sulfonic acid-(N-methyl)-phenylamide;

EXAMPLE 29

2-nitro-4'-(4''-butyl) - phenoxydiphenylamine - 4 - sulfonic acid-(N-ethyl)-phenylamide;

EXAMPLE 30

2-nitro-4'-(4''-butyl) - phenoxydiphenylamine - 4 - sulfonic acid-(N-hydroxyethyl)-phenylamide;

EXAMPLE 31

2-nitro-4'-(4''-butyl) - phenoxydiphenylamine - 4 - sulfonic acid-(N-hydroxypropyl)-phenylamide;

EXAMPLE 32

2-nitro-4'-(4''-butyl) - phenoxydiphenylamine - 4 - sulfonic acid-phenyl ester;

EXAMPLE 33

2-nitro-4'-(4''-butyl) - phenoxydiphenylamine - 4 - sulfonic acid-cyclohexyl amide;

EXAMPLE 34

2-nitro-4'-(4''-amyl) - phenoxydiphenylamine - 4 - sulfonic acid-morpholide;

EXAMPLE 35

2-nitro-4'-(4''-amyl) - phenoxydiphenylamine - 4 - sulfonic acid-phenylamide;

EXAMPLE 36

2-nitro-4'-(4''-amyl) - phenoxydiphenylamine - 4 - sulfonic acid-1'''.3'''-oxazolidide;

EXAMPLE 37

2-nitro-4'-(4''-amyl) - phenoxydiphenylamine - 4 - sulfonic acid-5'''-methyl-1'''.3'''-oxazolidide;

EXAMPLE 38

2-nitro-4'-(4''-amyl) - phenoxydiphenylamine - 4 - sulfonic acid-1'''.3'''-oxazide;

EXAMPLE 39

2-nitro-4'-(4''-amyl) - phenoxydiphenylamine - 4 - sulfonic acid-(N-methyl)-phenylamide;

EXAMPLE 40

2-nitro-4'-(4''-amyl) - phenoxydiphenylamine - 4 - sulfonic acid-(N-ethyl)-phenylamide;

EXAMPLE 41

2-nitro-4'-(4''-amyl) - phenoxydiphenylamine - 4 - sulfonic acid-(N-hydroxyethyl)-phenylamide;

EXAMPLE 42

2-nitro-4'-(4''-amyl) - phenoxydiphenylamine - 4 - sulfonic acid-(N-hydroxypropyl)-phenylamide;

EXAMPLE 43

2-nitro-4'-(4''-amyl) - phenoxydiphenylamine - 4 - sulfonic acid-phenyl ester;

EXAMPLE 44

2-nitro-4'-(4''-amyl) - phenoxydiphenylamine - 4 - sulfonic acid-cyclohexylamide;

EXAMPLE 45

2-nitro-4'-(4''-octyl) - phenoxydiphenylamine - 4 - sulfonic acid-1'''.3'''-oxazolidide;

EXAMPLE 46

2-nitro-4'-(4''-octyl) - phenoxydiphenylamine - 4 - sulfonic acid-5'''-methyl-1'''.3'''-oxazolidide;

EXAMPLE 47

2-nitro-4'-(4''-octyl) - phenoxydiphenylamine - 4 - sulfonic acid-1'''.3'''-oxazide;

EXAMPLE 48

2-nitro-4'-(4''-octyl) - phenoxydiphenylamine - 4 - sulfonic acid-(N-methyl)-phenylamide;

EXAMPLE 49

2-nitro-4'-(4''-octyl) - phenoxydiphenylamine - 4 - sulfonic acid-(N-propyl)-phenylamide;

EXAMPLE 50

2-nitro-4'-(4''-octyl) - phenoxydiphenylamine - 4 - sulfonic acid-(N-hydroxyethyl)-phenylamide;

EXAMPLE 51

2-nitro-4'-(4''-octyl) - phenoxydiphenylamine - 4 - sulfonic acid-(N-hydroxypropyl)-phenylamide;

EXAMPLE 52

2-nitro - 4' - (2''.4''-dibutyl)-phenoxydiphenylamine-4-sulfonic acid-(N-ethyl)-phenylamide;

EXAMPLE 53

2-nitro - 4' - (2''.4''-diamyl)-phenoxydiphenylamine-4-sulfonic acid-morpholide;

EXAMPLE 54

2-nitro - 4' - (2''.4''-diamyl)-phenoxydiphenylamine-4-sulfonic acid-1'''.3'''-oxazolidide;

EXAMPLE 55

2-nitro - 4' - (2''.4''-diamyl)-phenoxydiphenylamine-4-sulfonic acid-(N-ethyl)-phenylamide;

EXAMPLE 56

3.3'-dinitro-4.4'-bis-[(p-methoxyethoxy)-phenylamino]-1.1'-diphenylsulfone;

EXAMPLE 57

3.3'-dinitro-4.4'-bis-[(p - ethoxyethoxy) - phenylamino]-1.1'-diphenylsulfone;

EXAMPLE 58

3.3'-dinitro - 4.4' - bis-[p-butoxyethoxy)-phenylamino]-1.1'-diphenylsulfone;

EXAMPLE 59

3.3' - dinitro - 4.4' - bis - [(p-methoxyethoxyethoxy-1-chloro)-phenylamino]-1.1'-diphenylsulfone;

EXAMPLE 60

2-nitro-4'-phenyldiphenylamine - 4 - sulfonic acid-(N-ethyl)-phenylamide;

EXAMPLE 61

2-nitro-4'-phenylthiodiphenylamine-4-sulfonic acid-(N-ethyl)-phenylamide;

EXAMPLE 62

2-nitro-4'-benzyldiphenylamine - 4 - sulfonic acid - (N-ethyl)-phenylamide;

EXAMPLE 63

2-nitro-4' - styryldiphenylamine - 4 - sulfonic acid - (N-ethyl)-phenylamide;

EXAMPLE 64

2-nitro-4'-(4''-acetylamino) - phenylidiphenylamine - 4-sulfonic acid-(N-ethyl)-phenylamide;

EXAMPLE 65

2-nitro - 4' - (3'' - trifluoromethyl) - phenoxydiphenylamine-4-sulfonic acid-(N-butyl)-cyclohexylamide;

EXAMPLE 66

2-nitro-4'-phenyldiphenylamine-4-sulfonic acid-(N-2''-ethylhexyl)-cyclohexylamide;

EXAMPLE 67

2-nitro-4'-phenyldiphenylamine - 4 - sulfonic acid-di-n-hexylamide;

EXAMPLE 68

2-nitro-4'-(4''-benzyl)-phenoxydiphenylamine - 4 - sulfonic acid-di-n-octadecylamide;

EXAMPLE 69

2-nitro-3'-bromo - 4' - (4'' - amyl) - phenoxydiphenylamine-4-sulfonic acid-(2'''.6'''-dimethyl)-morpholide;

EXAMPLE 70

2-nitro-3'-fluoro - 4' - (4'' - methyl)-phenoxydiphenylamine-4-sulfonic acid naphthyl ester;

EXAMPLE 71

2-nitro - 4' - 4''-benzoylamino) - phenylidiphenylamine-4-sulfonic acid-(N-2''-ethylhexyl)-phenylamide;

EXAMPLE 72

2-nitro - 4' - (4'' - amyloxy)-phenoxydiphenylamine-4-sulfonic acid-(N-methyl)-phenylamide;

EXAMPLE 73

2-nitro - 4'-(4''-dodecyl)-phenoxydiphenylamine-4-sulfonic acid-(N-methyl)-phenylamide;

EXAMPLE 74

2-nitro - 4' - (4'' - nonyl)-phenoxydiphenylamine-4-sulfonic acid-(N-butyl)-phenylamide;

EXAMPLE 75

2-nitro-4'-(4''-octadecyl)-phenoxydiphenyl amine-4-sulfonic acid-α-naphthylamide;

EXAMPLE 76

2-nitro-4'-(4''- amyl)-phenoxydiphenylamine-4-sulfonic acid-(4'''-methyl)-phenyl ester.

EXAMPLE 77

100 parts of cellulose acetate are dissolved in 300 parts of solvent (93% acetone, 7% methanol); the solution is mixed for a short time and left overnight to swell.

1 part of the dyestuff obtainable according to Example 5 is dissolved in 85 parts of the solvent by simple agitation, and this solution run into the cellulose acetate solution. The mixture is stirred in an open vessel until 60 parts of the solvent have evaporated.

The dyed mass is fed into the spinning pot and extruded in the normal manner. The resulting filament is ready for further processing. It is fast to light, boiling, alkali, bleaching, cross dyeing, dry cleaning, gas fumes hydrosulfite, peroxide bleaching, oxalic acid, perspiration, wet pleating, sublimation, sea water, water, washing, rubbing and peracetic acid bleaching.

Formulae of representative dyestuffs of the foregoing examples are as follows:

EXAMPLE 5

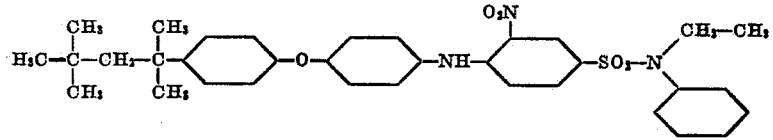

EXAMPLE 10

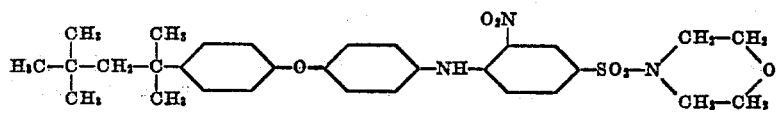

EXAMPLE 15
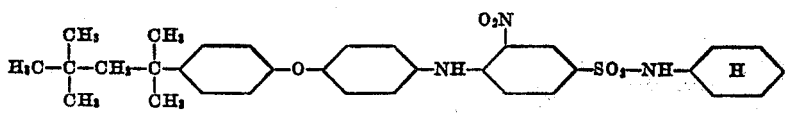
EXAMPLE 21
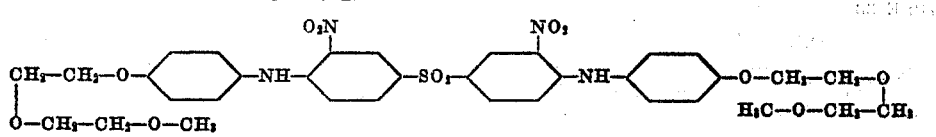
EXAMPLE 25
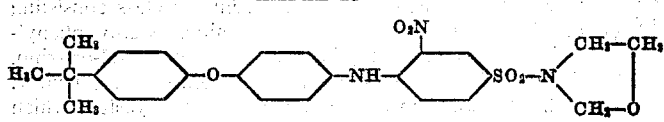
EXAMPLE 26
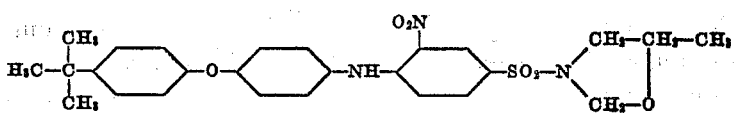
EXAMPLE 27
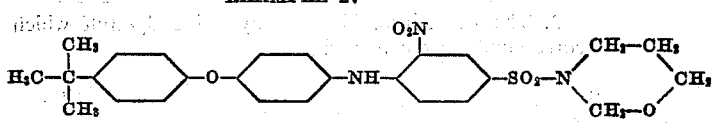
EXAMPLE 28
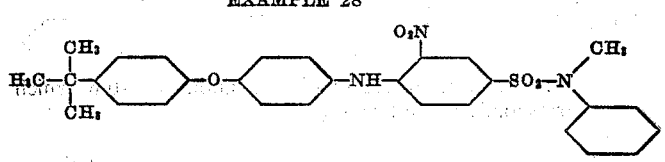
EXAMPLE 29
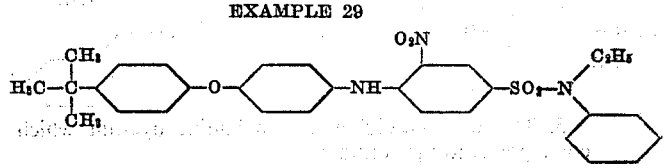
EXAMPLE 39
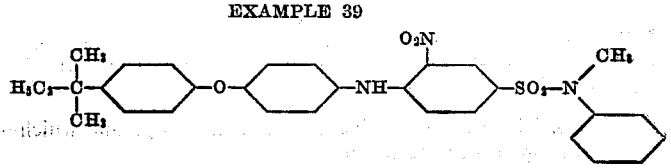
EXAMPLE 40
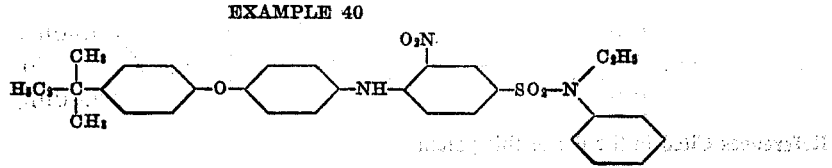
EXAMPLE 43
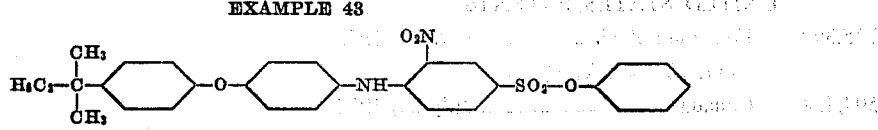
EXAMPLE 44
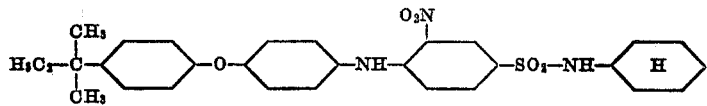
EXAMPLE 48
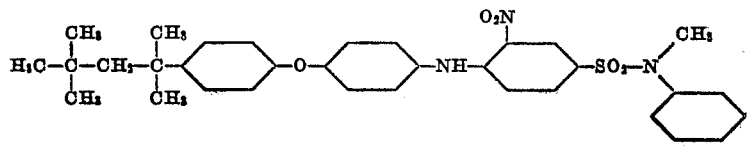

EXAMPLE 32

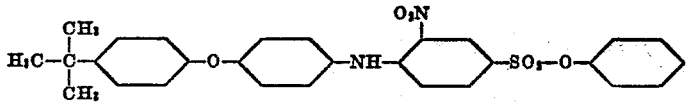

EXAMPLE 33

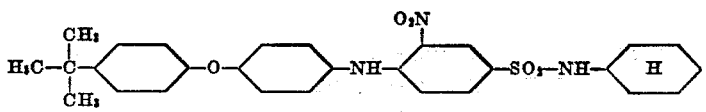

Having thus disclosed the invention what is claimed is:

1. A water-insoluble diphenylamine dyestuff of the formula

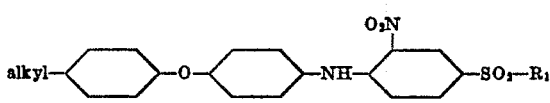

where $R_1$ is a member selected from the class consisting of phenylimino, N-methyl-phenylimino, N-ethyl-phenylimino, hexahydrophenylimino, morpholino, 1,3-oxazino, 5-methyl-1,3-oxazolidino, 1,3-oxazolidino, and phenoxy.

2. The water-insoluble diphenylamine dyestuff which corresponds to the formula

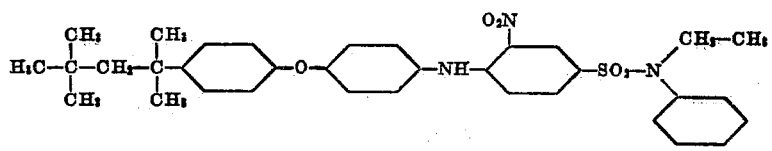

3. The water-insoluble diphenylamine dyestuff which corresponds to the formula

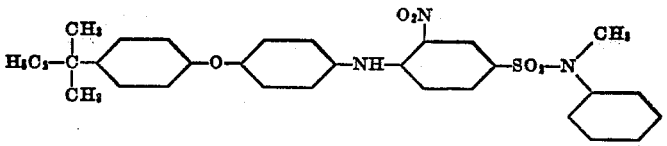

4. The water-insoluble diphenylamine dyestuff which corresponds to the formula

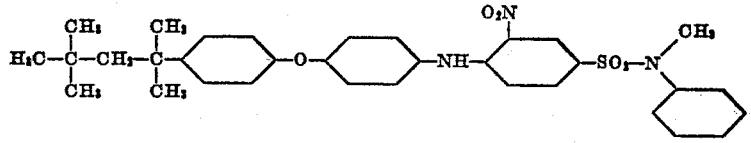

5. The water-insoluble diphenylamine dyestuff which corresponds to the formula

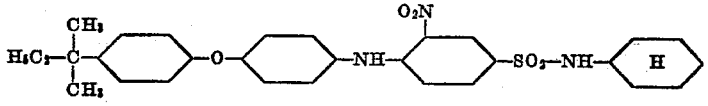

6. The water-insoluble diphenylamine dyestuff which corresponds to the formula

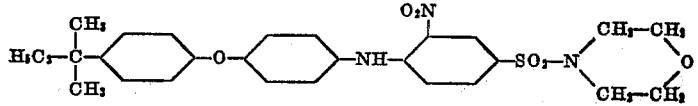

References Cited in the file of this patent
UNITED STATES PATENTS 2,725,390    Fogelman et al. _____ Nov. 29, 1955

FOREIGN PATENTS 504,428    Canada _____ July 24, 1954